United States Patent
Myong

(10) Patent No.: US 6,392,528 B1
(45) Date of Patent: May 21, 2002

(54) CIRCUIT PROTECTION DEVICES

(75) Inventor: Inho Myong, Newark, CA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/248,166

(22) Filed: Feb. 9, 1999

Related U.S. Application Data

(63) Continuation-in-part of application No. 08/868,905, filed on Jun. 4, 1997, now abandoned.

(51) Int. Cl.[7] ............................................. H01C 7/10
(52) U.S. Cl. ..................... 338/22 R; 338/23; 338/328; 338/331
(58) Field of Search ................ 361/56, 111, 119; 338/20, 22 R, 23, 24, 322, 328, 331

(56) References Cited

U.S. PATENT DOCUMENTS

| | | | | |
|---|---|---|---|---|
| 4,223,209 A | * | 9/1980 | Diaz ........................... | 219/549 |
| 4,237,441 A | | 12/1980 | van Konynenburg et al. ........................ | 338/22 R |
| 4,238,812 A | | 12/1980 | Middleman et al. ......... | 361/106 |
| 4,315,237 A | | 2/1982 | Middleman et al. ....... | 338/22 R |
| 4,317,027 A | | 2/1982 | Middleman et al. ......... | 219/553 |
| 4,426,633 A | | 1/1984 | Taylor ......................... | 338/25 |
| 4,486,737 A | * | 12/1984 | Ott ............................ | 338/22 R |
| 4,545,926 A | | 10/1985 | Fouts et al. .................. | 252/511 |
| 4,685,025 A | | 8/1987 | Carlomagno ................ | 361/106 |
| 4,689,475 A | | 8/1987 | Matthiesen .................. | 219/553 |

(List continued on next page.)

FOREIGN PATENT DOCUMENTS

| | | | |
|---|---|---|---|
| EP | 0 829 939 A | 3/1998 | |
| JP | 4-152601 | * 5/1992 | ............... 338/22 R |
| WO | WO 95/08176 | 3/1995 | |
| WO | WO 95/31816 | 11/1995 | |
| WO | WO 94/01876 | 1/1999 | |

OTHER PUBLICATIONS

Patent Abstracts of Japan, vol. 012, No. 104 (P–685), Apr. 6, 1988, & JP 62–238429A (Matsushita Electric Works Ltd), Oct. 19, 1987; category Y.

Patent Abstracts of Japan, vol. 015, No. 200 (E–1070), May 22, 1991, & JP 03–054801A (TDK Corp.), Mar. 8, 1991; category A.

U.S. Patent application No. 08/682,067 (Myong et al, filed Jul. 16, 1996); counterpart of International Publication No. WO 98/02946, published Jan. 22, 1998.

U.S. Patent application No. 08/682,172 (Myong, filed Jul. 16, 1996); counterpart of International Publication No. WO 98/02947, published Jan. 22, 1998.

*Primary Examiner*—Karl D. Easthom

(57) ABSTRACT

An electrical device which contains a first electrode, a second electrode, a third electrode, a first resistor which is connected in series between the first and second electrodes, and a second resistor which (i) is thermally coupled to the first resistor, (ii) exhibits anomalous resistance/temperature behavior, and (iii) is connected in series between the first and third electrodes. The device has at least one of the following characteristics: (a) the first resistor and at least one of the first and second electrodes are formed from a single piece of metal; (b) the device has a generally planar configuration and comprises at least one electrical connector connected to one of the first, second, and third electrodes, whereby the first, second and third electrodes or connectors secured thereto can be secured directly to a circuit board with the device parallel to the circuit board; and (c) the second resistor is a planar sheet of a material which exhibits anomalous resistance/temperature behavior, the sheet having a first major surface to which the first and second electrodes are attached and a second major surface to which the third electrode is attached. The device can be prepared from an electrical assembly which can be divided into a plurality of devices.

19 Claims, 4 Drawing Sheets

U.S. PATENT DOCUMENTS

| | | | |
|---|---|---|---|
| 4,724,417 A | 2/1988 | Au et al. | 338/22 R |
| 4,774,024 A | 9/1988 | Deep et al. | 252/511 |
| 4,780,598 A * | 10/1988 | Fahey et al. | 219/511 |
| 4,800,253 A | 1/1989 | Kleiner et al. | 219/553 |
| 4,845,838 A | 7/1989 | Jacobs et al. | 29/671 |
| 4,857,880 A | 8/1989 | Au et al. | 338/22 R |
| 4,859,836 A | 8/1989 | Lunk et al. | 219/548 |
| 4,907,340 A | 3/1990 | Fang et al. | 29/610.1 |
| 4,924,074 A | 5/1990 | Fang et al. | 219/548 |
| 4,935,156 A | 6/1990 | van Konynenburg | 219/553 |
| 4,967,176 A | 10/1990 | Horsma et al. | 338/22 R |
| 5,049,850 A | 9/1991 | Evans et al. | 338/22 R |
| 5,089,801 A | 2/1992 | Chan et al. | 338/22 R |
| 5,153,805 A | 10/1992 | Tennant et al. | 361/27 |
| 5,166,658 A * | 11/1992 | Fang et al. | 338/22 R |
| 5,296,996 A * | 3/1994 | Hansson et al. | 361/24 |
| 5,378,407 A | 1/1995 | Chandler et al. | 252/513 |
| 5,386,335 A * | 1/1995 | Amano et al. | 361/56 |
| 5,436,609 A | 7/1995 | Chan et al. | 338/22 R |
| 5,590,010 A * | 12/1996 | Ceola et al. | 361/106 |
| 5,644,283 A * | 7/1997 | Grosse-Wilde et al. | 338/20 |
| 5,663,702 A * | 9/1997 | Shaw, Jr. et al. | |
| 5,724,221 A * | 3/1998 | Law | 361/127 |
| 5,777,541 A * | 7/1998 | Vekeman | 338/22 R |
| 5,818,676 A * | 10/1998 | Gronowicz, Jr. | 338/22 R |
| 5,831,510 A | 11/1998 | Zhang et al. | 338/22 R |
| 5,852,397 A | 12/1998 | Chan et al. | 338/22 R |
| 5,907,272 A * | 5/1999 | McGuire | 338/22 R |

* cited by examiner

CIRCUIT PROTECTION DEVICES

RELATED APPLICATIONS

This application is a continuation of U.S. patent application Ser. No. 08/868,905, filed Jun. 4, 1997, now abandoned and is related to copending U.S. patent application Ser. Nos. 08/682,067 (Myong et al, filed Jul. 16, 1996) and Ser. No. 08/682,172 (Myong, filed Jul. 16, 1996), the disclosures of which are incorporated herein by reference for all purposes.

BACKGROUND OF THE INVENTION

1. Field of the Invention

This invention relates to electrical circuit overcurrent protection.

2. Introduction to the Invention

Positive temperature coefficient (PTC) circuit protection devices are well known. The device is placed in series with a load, and under normal operating conditions is in a low temperature, low resistance state. However, if the current through the PTC device increases excessively, and/or the ambient temperature around the PTC device increases excessively, and/or the normal operating current is maintained for more than the normal operating time, then the PTC device will be "tripped," i.e. converted to a high temperature, high resistance state such that the current is reduced substantially. Generally, the PTC device will remain in the tripped state, even if the current and/or temperature return to their normal levels, until the PTC device has been disconnected from the power source and allowed to cool. Particularly useful PTC devices contain a PTC element which is composed of a PTC conductive polymer, i.e. a composition which comprises (1) an organic polymer, and (2) dispersed, or otherwise distributed, in the polymer, a particulate conductive filler, preferably carbon black and/or a conductive inorganic filler, e.g. a ceramic oxide or a metal carbide, nitride, or boride such as titaniun carbide. PTC conductive polymers and devices containing them are described, for example in U.S. Pat. Nos. 4,237,441, 4,238,812, 4,315,237, 4,317,027, 4,426,633, 4,545,926, 4,689,475, 4,724,417, 4,774,024, 4,780,598, 4,800,253, 4,845,838, 4,857,880, 4,859,836, 4,907,340, 4,924,074, 4,935,156, 4,967,176, 5,049,850, 5,089,801 and 5,378,407, and in International Patent Publication Nos. WO 94/01876, WO 95/08176 and WO 95/31816 (corresponding to U.S. patent application Ser. No. 08/710,925 (Zhang et al, filed Sep. 24, 1996) and Ser. No. 08/727,869 (Graves et al, filed Oct. 8, 1996)), the disclosures of which are incorporated herein by reference for all purposes. Ceramic PTC materials are also well known.

Negative temperature coefficient (NTC) circuit protection devices containing ceramic NTC materials are also well known.

U.S. patent application Ser. No. 08/682,067 describes an overcurrent protection system which will give a rapid response to even relatively small overcurrents. In that system, a sensor element and circuit interruption element are placed in series with the load, and the sensor element is functionally linked to the circuit interruption element via a control element, so that, when the current in the circuit exceeds a predetermined amount, the sensor element senses the overcurrent and communicates with the control element. The control element causes the circuit interruption element to change from a relatively conductive normal state to a relatively non-conductive fault state (including a completely open state). In a preferred embodiment, the sensor element comprises a resistive device connected in series with the load, and the control element comprises a PTC device which is thermally linked to the resistive device and is electrically connected to the circuit interruption element. When an over current passes through such a system, the resistive device increases in temperature causing the PTC device to heat up and trip to its high resistance state. The PTC device is linked to the circuit interruption element so that the increased resistance of the PTC device causes the circuit interruption element to switch into its fault state. The PTC device is not placed in series with the load and therefore may operate at current levels much less than the normal circuit current which passes through the load.

SUMMARY OF THE INVENTION

This invention relates to devices which combine a resistive heating element and an element which is thermally linked to the heating element, and exhibits anomalous resistance/temperature behavior. The devices are particularly, but not exclusively, useful in the protection systems described in U.S. patent applications Ser. Nos. 08/682,067 and 08/682,172.

In a first aspect, this invention provides an electrical device which comprises:

(1) a first electrode;
(2) a second electrode;
(3) a third electrode;
(4) a first resistor which is connected in series between the first and second electrodes; and
(5) a second resistor which (i) is thermally coupled to the first resistor, (ii) exhibits anomalous resistance/temperature behavior, and (iii) is connected in series between the first and third electrode.

The first resistor must be one whose temperature changes substantially (as a result of a change in the amount of heat generated within it by resistive heating, also known as Joule or $I^2R$ heating) when the current passing through it changes from a first value (usually a normal operating value) to a second value (usually an abnormal, relatively high, fault value). As a result of the change in temperature of the first resistor, the second resistor changes in temperature, and, therefore, in resistance, which in turn substantially changes the current which flows between the first and third electrodes.

The devices of the invention are particularly useful when (a) the second current value is a fault current which is substantially higher than the first current value (which is the normal operating current), and thus causes the first resistor to increase in temperature; and (b) the second resistor is a PTC resistor which increases substantially in resistance as a result of the heat generated within the first resistor, and thus reduces the current which flows between the first and third electrodes. The invention will, therefore, be described chiefly by reference to such devices. It is to be understood, however, that the invention also includes devices as defined above which achieve useful results in a different way, for example devices in which (a) the change in the current reduces the amount of heat generated by the first resistor and thus reduces the temperature of the second resistor; and/or (b) the change in the current through the first resistor is a reduction in size of the current; and/or (c) the change in the current through the resistor is a change in frequency which changes the amount of the heat generated within the first resistor, and/or (d) the first resistor is a voltage-dependent resistor, and/or (e) the second resistor is an NTC resistor.

The devices of the invention are particularly useful in circuits in which (a) the first and second electrodes and the first resistor are in series with the load, and (b) the first and third electrodes and the second resistor are in series with a control element which is coupled to a circuit interruption element so that, when there is an overcurrent through the load, the reduction of current through the control element activates the circuit-interruption element to interrupt, or to reduce substantially, the current through the load. For example, the control element can be a relay coil and the circuit-interruption element a set of relay contacts controlled by the relay coil. Alternatively the control and circuit-interruption elements can be combined in a single three terminal solid state device. For further details and specific examples of such circuits, reference should be made to U.S. application Ser. Nos. 08/682,067 and 08/682,172.

The invention also includes electrical asemblies which can be divided into a plurality of devices of the invention and which preferably comprise (1) a planar sheet of a composition which exhibits PTC behavior, the sheet having a first major surface and an opposite second major surface;

(2) a first planar metal foil member which is secured to the first major surface of the PTC sheet; and (3) a second planar metal foil member which is secured to the second major surface of the PTC sheet;

at least one of the first and second metal foil members having been etched so that the assembly comprises a plurality of identical assembly sub-portions, each of the assembly sub-portions (i) becoming a device as described in the first aspect of the invention when the assembly is divided into a plurality of devices, and (ii) comprising (a) a metal foil member which is secured to a major surface of the PTC sheet and comprises a first electrode, a second electrode and a resistor connected in series between the first and second electrodes, (b) a sub-portion of the PTC sheet, and (c), secured to the opposite face of the sub-portion of the PTC sheet, a third electrode.

BRIEF DESCRIPTION OF THE DRAWINGS

The invention is illustrated in the accompanying drawings, in which.

DETAILED DESCRIPTION OF THE INVENTION

Figure 1:
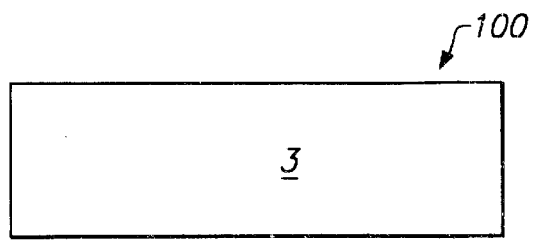
FIGS. 1 and 2 are top and bottom plan views, respectively, of a device of the invention.

The first resistor is preferably integral with at least one, particularly both, of the first and second electrodes. For example, the first and second electrode and the first resistor are preferably formed by removing part of the metal from the central portion of a single piece of metal, e.g. (a) by etching a layer of metal (for example a metal foil) already secured to a layer of PTC material (which is not changed by the etching process), or (b) by stamping a piece of metal before it is connected to the remainder of the device, or (c) by stamping a laminate of a metal layer and a PTC layer (in which case the PTC layer and any other layer of the laminate, e.g. the third electrode on the opposite surface of the laminate, assumes the same shape). The cross-sectional area of the first resistor (at right angles to the direction of current flow) is preferably 0.1 to 0.8, particularly 0.15 to 0.5 times the cross-sectional area of each of the electrodes. The first resistor can be a single bar, or two or more bars, extending between the first and second electrodes.

In other embodiments of the invention, the first resistor is a carbon resistor, a wire-wound resistor, or a PTC resistor. In principal, it is possible to use any resistor which will, in response to an overcurrent, heat the second PTC resistor so that the resistivity of at least part of the PTC material in the second resistor increases sharply. Thus, if the first resistor is a PTC resistor, it should have a switching temperature higher than the second resistor.

The PTC second resistor is preferably in the form of a planar sheet having first and second major surfaces, at least one of the first and second electrodes being secured to the first major surface and the third electrode being secured to the opposite second major surface. The PTC material preferably comprises an organic polymer and, dispersed therein, a particulate conductive filler. However, it is also possible to use the well-known PTC ceramics. The resistivity of the PTC material, the dimensions of the second resistor, and the thermal coupling between the first and second resistors, should be selected so as to achieve (a) the desired current between the first and third electrodes (i.e. through the second resistor) during normal operation and (b) the desired reduction in that current when there is a fault. If desired, a body of thermally and electrically insulating material can be placed over at least part of, and often all of, the first resistor and/or a layer of a thermally (and optionally electrically) conductive material can be placed between the first and second resistors to modify (usually to increase) the amount of the heat transferred to the second, PTC, resistor. It is usually desirable that a fault condition should reduce the current between the first and third electrodes (or between (i) the first and second electrodes and (ii) the third electrode when, as is often the case, there is also current flow between the second and third electrodes) to less than 0.6 times, particularly less than 0.4 times, the normal operating current.

It is often desirable to connect the device to a circuit board. For this purpose, in one embodiment of a device suitable for connection to a circuit board, the second resistor is a planar sheet of a PTC material, the sheet having a first major surface and an opposite second major surface; the first, second and third electrodes are first, second and third planar metal members, the first and second electrodes being secured to the first major surface of the planar PTC sheet and the third electrode being secured to the second major surface of the planar PTC sheet; and the device further comprises an electrical connector which extends from the third electrode to the plane of the first and second electrodes. Preferably the device further comprises a fourth planar metal member which is secured to the first major surface of the planar PTC sheet and is separate from the first and second electrodes; and the electrical connector contacts the planar PTC sheet and is connected to the third electrode and to the fourth metal member. Often the device contains two fourth metal members to provide physical, electrical, and thermal symmetry, allowing the device to be installed without the need to ensure a particular orientation. The electrical connector can be separate from the second resistor, but preferably contacts it. Particularly preferred connectors pass through an aperture in the second resistor, the term aperture being used to denote an opening which (a) has a closed cross section, e.g. a circle, an oval, or a generally rectangular shape, or (b) has an open reentrant cross section which (i) has a depth at least 0.15 times, preferably at least 0.5 times, particularly at least 1.2 times, the maximum width of the cross section, e.g. a quarter circle or a half circle or an open-ended slot, and/or (ii) has at least one part where the opposite edges of the cross section are parallel to each other.

Such a connector is often known as a via.

In another embodiment of a device suitable for mounting on a circuit board, with the device spaced away from the board, the device comprises a first electrical lead which is connected to the first electrode, a second electrical lead which is connected to the second electrode, and a third electrical lead which is connected to the third electrode, the leads having distal ends. The distal ends preferably terminate in the same plane, allowing ready connection of the device to a circuit board. For some applications, the ends of the leads can be shaped to allow easy through hole insertion into a circuit board. The leads can be shaped so as to ensure that they do not physically constrain the PTC element, as disclosed, for example, in U.S. Pat. No. 4,685,025 (Carlomagno), the disclosure of which is incorporated herein by reference for all purposes.

The size of devices of the invention is a function of the desired operational current that is required to operate the circuit component connected in series with the device. Generally devices have a maximum size of 1 inch$^2$ (645 mm$^2$). Prior to installation onto a circuit board, the resistance of the device measured either from the first to the second electrode or from the first to the third electrode is generally less than 100 ohms, preferably less than 50 ohms, particularly less than 20 ohms, especially less than 10 ohms, more especially less than 5 ohms. For some applications, the resistance is much lower, e.g. 0.010 to 0.500 ohms. In general, the resistance measured from the first to the second electrode is much lower than that measured from the first to the third electrode. The device resistance can be controlled by the resistivity of the PTC composition of the second resistor, as well as by the thickness of the second resistor and the device area. Devices of the invention are suitable for use in applications in which the normal operating current, i.e. the current from the first to the second electrode through the first resistor, is 15 to 60 amperes, although different devices may be suitable for use in applications with either higher or lower operating currents. The fault current is generally at least 1.35 times, preferably at least 1.4 times, particularly at least 1.5 times the operating current.

The devices of the invention are preferably made from an electrical assembly. The assembly comprises a planar sheet of a composition exhibiting PTC behavior, and is preferably a sheet of a PTC conductive polymer composition. First and second planar metal foil members are secured to the first and second major surfaces of the sheet. At least one, and often both, of the first and second metal foil members have been etched, or otherwise shaped or had material removed, so that the assembly comprises a plurality of assembly sub-portions, preferably a plurality of identical assembly sub-portions. Each of the assembly sub-portions becomes a device when the assembly is divided into a plurality of devices. Each of the assembly sub-portions comprises (a) a metal foil member which is secured to a major surface of the PTC sheet and comprises a first electrode, a second electrode and a resistor connected in series between the first and second electrodes, (b) a sub-portion of the PTC sheet, and (c), secured to the opposite face of the sub-portion of the PTC sheet, a third electrode. The assembly can be divided into a plurality of devices by any suitable method, e.g. by shearing, dicing, or fracturing along a discontinuity such those described in U.S. application Ser. No. 08/710,925 (Zhang et al, filed Sep. 24, 1996) now U.S. Pat. No. 5,831,510, the disclosure of which is incorporated herein by reference. Often a solder mask, e.g. of the type described in International Patent Publication No. WO 95/31816, may be present, particularly if etching of one or both of the first and second metal foil members is conducted. The solder mask may serve as a layer of electrical and thermal insulation, and may cover at least part of the first resistor. The assembly is preferably prepared so that both of the first and second metal foil members have been etched. This allows the assembly to have balanced physical properties, e.g. it prevents the assembly from flexing non-uniformly during manufacture due to differential thermal expansion.

Figure 2:
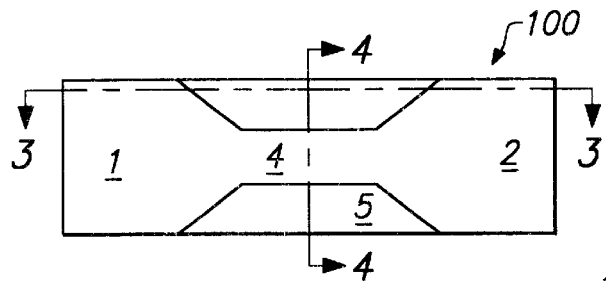
Figure 3:
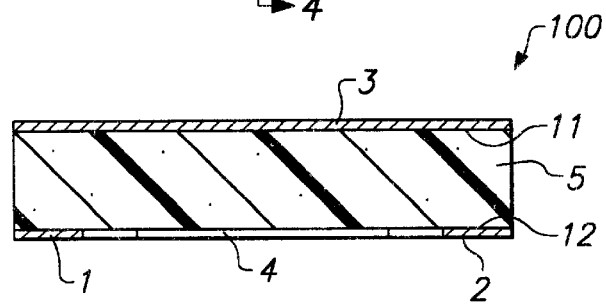
FIGS. 3 and 4 are cross-sectional views along lines 3—3 and 4—4, respectively, of FIG. 2.
Figure 4:
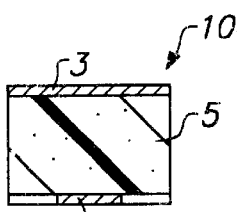

Referring now to the drawings, FIGS. 1 to 4 show an electrical device 100 of the invention. FIGS. 1 and 2 are top and bottom plan views of device 100, and FIGS. 3 and 4 are cross-sectional views along lines 3—3 and 4—4, respectively, of FIG. 2. First electrode 1 and second electrode 2 are connected by first resistor 4 and are positioned on first major surface 10 of second resistor 5, which is a PTC conductive polymer in the form of a sheet. Third electrode 3 is positioned on second major surface 11 of second resistor 5.

Figure 5:
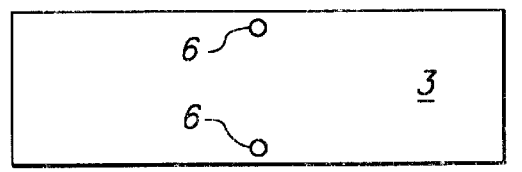
FIGS. 5 and 6 are top and bottom plan views, respectively, of another device of the invention.
Figure 6:
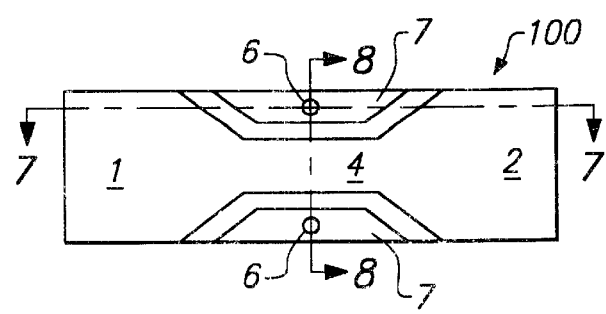
Figure 7:
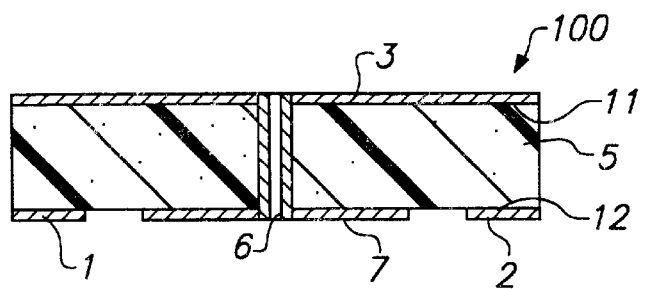
FIGS. 7 and 8 are cross-sectional views along lines 7—7 and 8—8, respectively, of FIG. 6.
Figure 8:
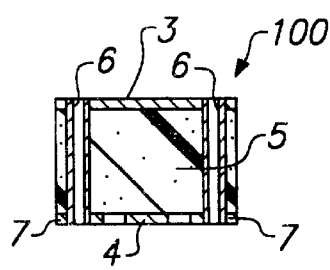

FIGS. 5 to 8 show another electrical device 100 of the invention. FIGS. 5 and 6 are tope and bottom plan views of device 100, and FIGS. 7 and 8 are cross-sectional views along lines 7—7 and 8—8, respectively, of FIG. 6. Electrical connector 6, shown here as a via coated with metal, passes through second resistor 5, connecting third electrode 3 to fourth metal member 7. As shown, device 100 is symmetrical, containing two connectors 6 and two fourth metal members 7. This is desirable for some applications, e.g. to avoid the need to carefully position the device in a particular orientation on a circuit board.

Figure 9:
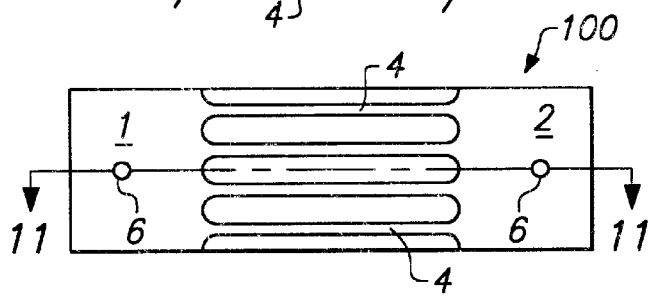
FIGS. 9 and 10 are top and bottom plan views, respectively, of another device of the invention.
Figure 10:
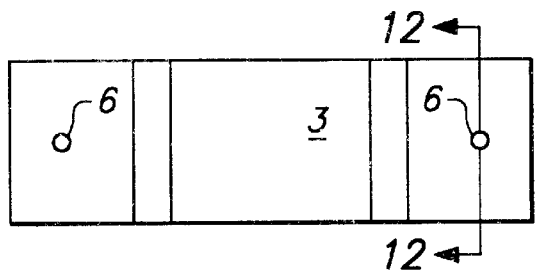
Figure 11:
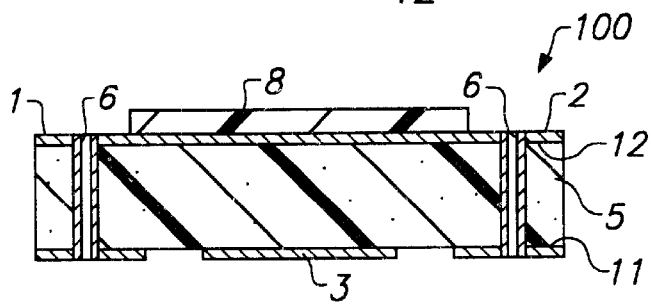
FIG. 11 is a cross-sectional view along line 11—11 of FIG. 9.
Figure 12:
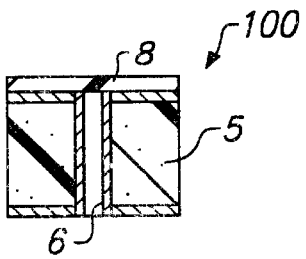
FIG. 12 is a cross-sectional view along line 12—12 of FIG. 10.

FIGS. 9 to 12 show another electrical device 100 of the invention. FIGS. 9 and 10 are top and bottom plan views. First resistor 4 is present in the form of parallel bars on the top surface, and, as shown in FIG. 11, a cross-sectional view along line 11—11 of FIG. 9, is covered at least in part by electrical and thermal insulation layer 8. FIG. 12, a cross-sectional view along line 12—12 of FIG. 10, shows electrical connector 6 which passes through second resistor 5 to connect first resistor 1 to third resistor 3 and second resistor 1 to third resistor 3.

Figure 13:
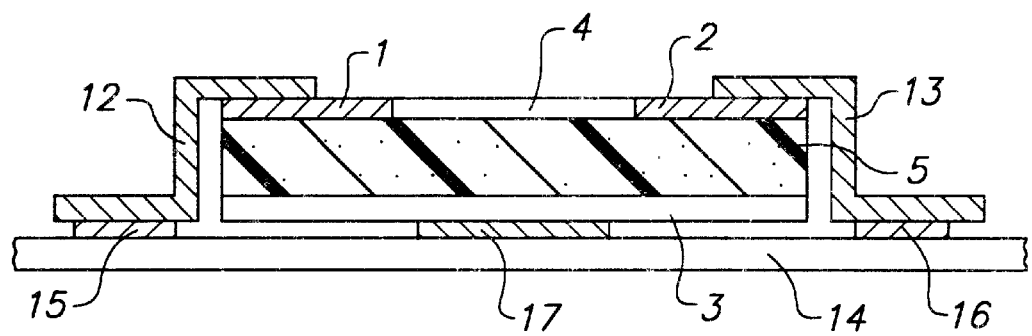
FIGS. 13 and 14 are cross-sectional views of devices of the invention installed on a circuit board.
Figure 14:
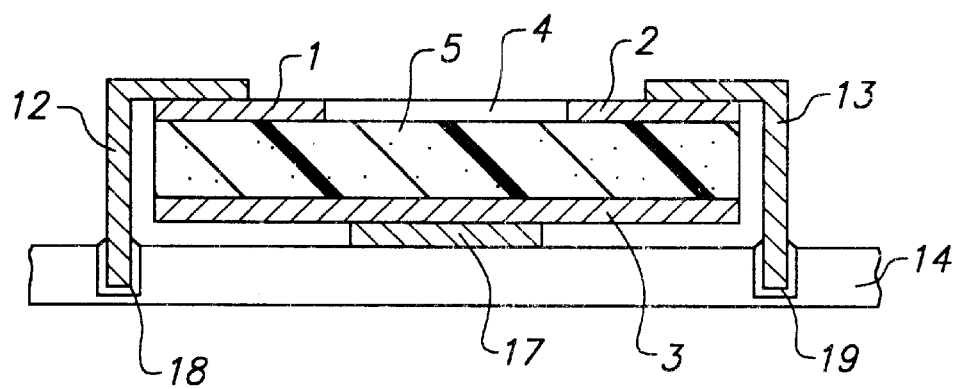

FIGS. 13 and 14 show the device of FIGS. 1 to 4 installed on circuit board 14 in a configuration parallel to the circuit board. First electrical lead 12 is connected to first electrode 1 and second electrical lead 13 is connected to second electrode 2. In FIG. 13, the shape of the first and second leads allows surface mounting directly onto circuit board 14: first lead 12 connects to first pad 15, second lead 13 connects to second pad 16, and third electrode 3 connects to third pad 17. The first second, and third pads may be solder, a conductive adhesive, or any other suitable material. The first and second leads 12,13 of the device in FIG. 14 allow through hole mounting of first lead 12 into first hole 18 and second lead 13 into second hole 19.

Figure 15:
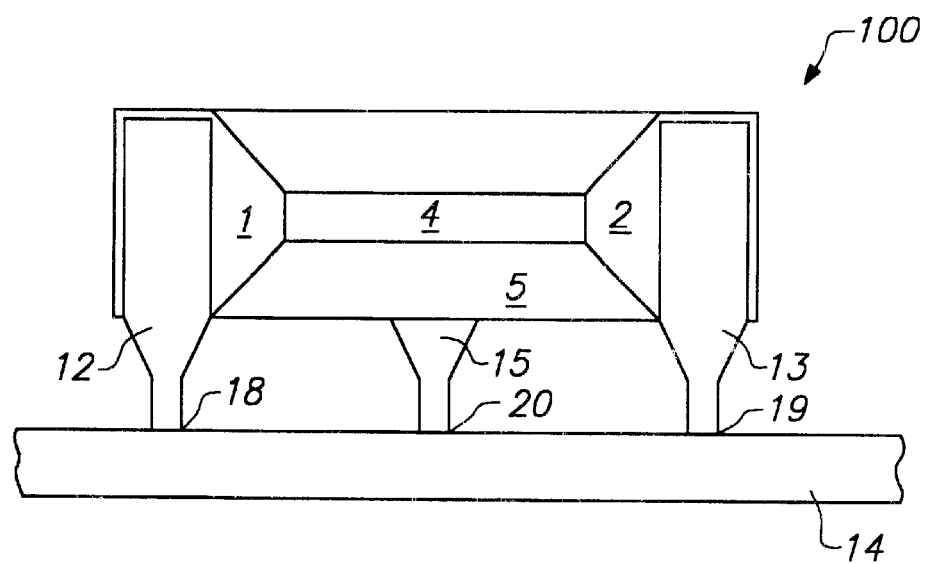
FIG. 15 is a plan view of another device of the invention installed on a circuit board.

FIG. 15 shows the device of FIGS. 1 to 4 installed in a vertical manner onto circuit board 14. Third electrical lead 15 is attached to third electrode 3. First, second, and third leads 12,13,15 are mounted into first, second, and third holes 18,19,20, respectively.

Figure 16:
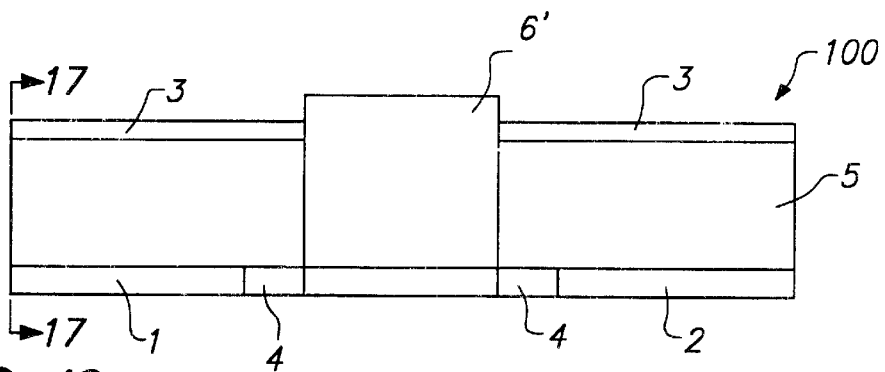
FIG. 16 is a plan view of another device of the invention.
Figure 17:
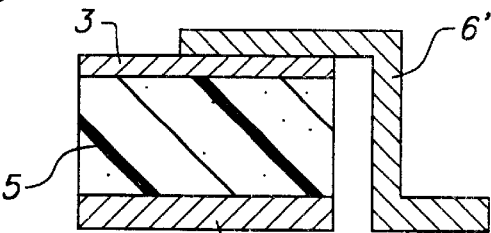
FIG. 17 is a cross-sectional view along line 17—17 of FIG. 16.

FIG. 16 shows a plan view of device 100 of the invention, and FIG. 17 is a cross-sectional view along line 17—17 of FIG. 16. In this embodiment, electrical connector 6' extends from third electrode 3 to the plane of the first and second electrodes 1,2, but is in the form of a strap, rather than a via First electrode 1, second electrode 2, and electrical connector 6' can be attached to pads on a circuit board.

Figure 18:
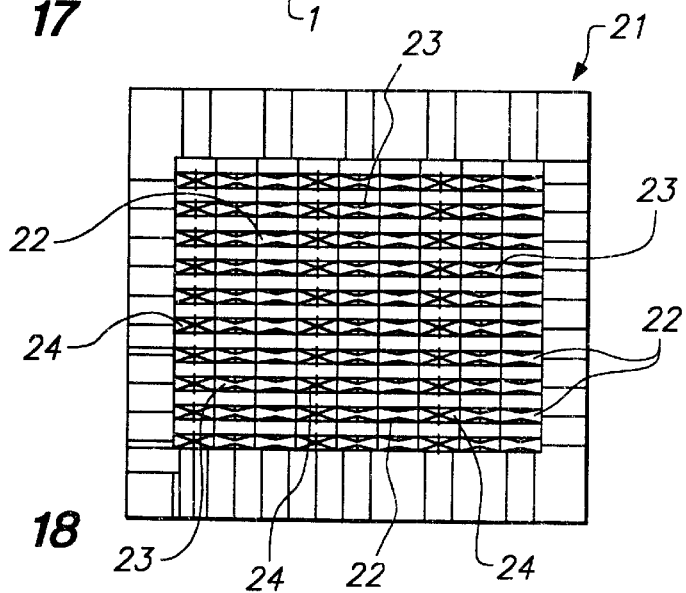
FIG. 18 is a plan view of an electrical assembly of the invention.

FIG. 18 shows assembly 21 of the invention in plan view. Sub-portions 22,23,24, having three slightly different etched patterns form assembly 21. Upon singularization, the sub-portions will each form a device.

Figure 19:
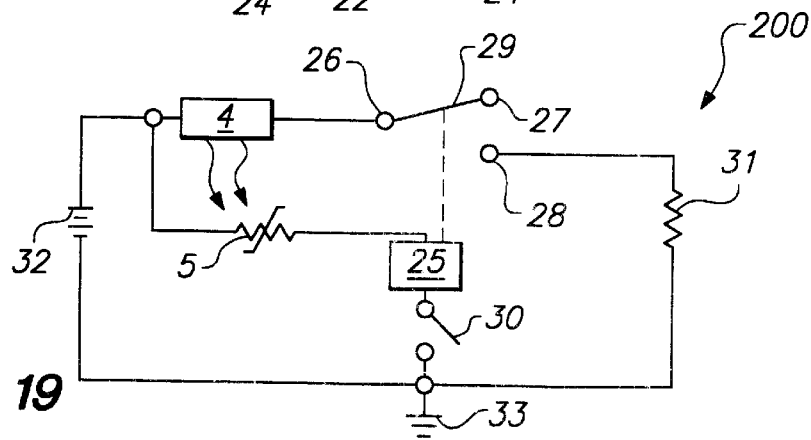
FIG. 19 is a circuit according to the invention.

FIG. 19 is a circuit diagram of a circuit of the invention and corresponds generally to FIG. 3 of U.S. application Ser. No. 08/682,067, the disclosure of which is incorporated herein by reference. Overcurrent circuit 200 employs an arrangement of second resistor 5, first resistor 4, relay coil 25, a set of contacts 26,27,28,29 and an on/off switch 30. In circuit 200, resistor 4 is placed in series with load 31 and second resistor 5 is placed in series with relay coil 25, with the latter series combination connected across power source 32. Ground is element 33.

What is claimed is:

1. A generally rectangular electrical overcurrent sensing device which comprises:
    (1) a first planar metal foil electrode at one end region of the device;
    (2) a second planar metal foil electrode at another end region of the device oppositely of the first planar metal foil electrode;
    (3) a third planar metal foil electrode at an intermediate region of the device;
    (4) a planar metal foil current-concentrating conductor bridging between the first and second electrodes;
    (5) a planar sheet of a composition which exhibits PTC behavior and which comprises a crystalline organic polymer and a particulate conductive filler dispersed in the organic polymers the planar sheet having a first major surface and an opposite second major surface;
    (6) an electrical connector; and
    (7) a fourth planar metal member of metal foil which is secured to the first major surface of the planar PTC sheet and is spatially separate from the first and second electrodes and conductor;
the first and second electrodes and the conductor being different regions of a unitary sheet of metal foil which is secured to the first major surface of the planar PTC sheet, the conductor having a transverse cross-sectional area smaller than a transverse cross-sectional area of each of the first and second electrodes, the third electrode being secured to the second major surface of the planar PTC sheet, and the electrical connector contacting the planar PTC sheet and connecting the third electrode and the fourth metal member.

2. A device according to claim 1 wherein the electrical connector comprises a via passing through the planar PTC sheet from the third electrode to the fourth planar metal member.

3. An electrical assembly which can be divided into a plurality of generally rectangular electrical overcurrent sensing devices which comprises
    (1) a planar sheet of a composition which exhibits PTC behavior, the sheet having a first major surface and an opposite second major surface;
    (2) a first planar metal foil member which is secured to the first major surface of the PTC sheet; and
    (3) a second planar metal foil member which is secured to the second major surface of the PTC sheet;
at least one of the first and second metal foil members having been etched so that the assembly comprises a plurality of identical assembly sub-portions, each of the assembly sub-portions
    (i) comprising a device when the assembly is divided into a plurality of devices, said device comprising
        (a) a first planar metal foil electrode at one end region of the device;
        (b) a second planar metal foil electrode at another end region of the device oppositely of the first planar metal foil electrode;
        (c) a third planar metal foil electrode at an intermediate region of the device;
        (d) a planar metal foil current-concentrating conductor bridging between the first and second electrodes; and
        (e) a planar sheet of a composition which exhibits PTC behavior and which comprises a crystalline organic polymer and a particulate conductive filler dispersed in the organic polymer, the planar sheet having a first major surface and an opposite second major surface; the first and second electrodes and the conductor being different regions of a unitary sheet of metal foil which is secured to the first major surface of the planar PTC sheet, the conductor having a transverse cross-sectional area smaller than a transverse cross-sectional area of each of the first and second electrodes, and the third electrode being secured to the second major surface of the planar PTC sheet, and
    (ii) comprising (a) a metal foil member which is secured to a major surface of the PTC sheet and defines the first electrode, the second electrode and the current-concentrating conductor between the first and second electrodes, (b) a subportion of the PTC sheet, and (c) secured to the opposite face of the subportion of the PTC sheet, the third electrode.
wherein the first and second metal foil members have been etched so that the assembly is divisible into the plurality of devices without dividing any of the metal foil members.

4. An assembly according to claim 3 wherein both of the first and second metal foil members have been etched so that the assembly has balanced physical properties for impeding non-uniform flexure during manufacture due to differential thermal expansion.

5. An electrical circuit which comprises
    (1) an electrical power supply;
    (2) an electrical load;
    (3) a circuit interruption element connected in series with the power supply and the load;
    (4) an electrical overcurrent sensing device having a top major surface and a bottom major surface and including a metal foil conductor defined along the top major surface, the metal foil conductor having a first electrode portion at one end region, a second electrode portion at an opposite end region, and a bridging portion between the first electrode portion and the second electrode portion, the bridging portion having an electrical current concentrating characteristic; the device further including a planar sheet of a composition which exhibits PTC behavior and which comprises an organic polymer having a particulate conductive filler dispersed therewithin, the planar sheet having a first major surface contacting the bridging portion and having an opposite second major surface; a third electrode being secured to the second major surface of the planar PTC sheet such that heat generated in the bridging portion from electrical overcurrent flowing through the metal foil conductor is transferred to the planar sheet exhibiting PTC behavior and results in a control current flow to said third electrode indicative of said electrical overcurrent; and (5) a control element which is
   (a) connected in series with the first and third electrodes, and
   (b) coupled to the circuit interruption element;
whereby, when there is an overcurrent through the load, the consequent reduction in current through the control element activates the circuit interruption element to reduce the current through the load.

6. A generally rectangular, planar electrical overcurrent sensing device having a top major surface and a bottom major surface and including a metal foil conductor defined along the top major surface, the metal foil conductor having a first electrode portion at one end region, a second electrode portion at an opposite end region, and a bridging portion between the first electrode portion and the second electrode portion, the bridging portion having an electrical current concentrating characteristic; the device further including a planar sheet of a composition which exhibits PTC behavior and which comprises an organic polymer having a particulate conductive filler dispersed therewithin, the planar sheet having a first major surface contacting the bridging portion and having an opposite second major surface; a third electrode being secured to the second major surface of the planar PTC sheet such that heat generated in the bridging portion from electrical overcurrent flowing through the metal foil conductor is transferred to the planar sheet exhibiting PTC behavior and results in a control current flow to said third electrode indicative of said electrical overcurrent.

7. The electrical overcurrent sensing device of claim 6 wherein the organic polymer comprises a crystalline organic polymer.

8. The electrical overcurrent sensing device of claim 6 further comprising a control electrode of metal foil substantially coplanar with the meal foil conductor and spaced away therefrom, and an electrical connector for connecting the third electrode to the control electrode.

9. The electrical overcurrent sensing device of claim 8 wherein the electrical connector comprises a via passing through the planar PTC sheet from the third electrode to the control electrode.

10. The electrical overcurrent sensing device of claim 6 wherein the bridging portion having an electrical current concentrating characteristic has a transverse cross-sectional area less than a transverse cross-sectional area of each of the first and second electrode portions.

11. The electrical overcurrent sensing device of claim 10 wherein the metal foil conductor has a substantially uniform thickness and wherein the bridging portion has a transverse width less than a transverse width of each of the first and second electrode portions.

12. The electrical overcurrent sensing device of claim 10 wherein the bridging portion has a transverse cross-sectional area lying within a range of 0.1 to 0.8 times the transverse cross-sectional area of each of the first and second electrode portions.

13. The electrical overcurrent sensing device of claim 6 wherein the planar sheet of the composition which exhibits PTC behavior has the same length and width dimensions as the device and wherein the third electrode extends across the bottom major surface of the device.

14. The electrical overcurrent sensing device of claim 13 further comprising a first control electrode of metal foil formed as part of, and substantially coplanar with, the metal foil conductor and separated from the control electrode by a metal removal process during a manufacturing step, and a first electrical connector comprising at least one via for connecting the third electrode to the control electrode.

15. The electrical overcurrent sensing device of claim 6 wherein a nominal current flow between the first and second electrode portions is within a range of 15 and 60 amperes and wherein said electrical overcurrent is within a range of 1.35 and 1.5 times the nominal current flow.

16. The electrical overcurrent sensing device of claim 6 further comprising a first lead bonded to the first electrode, a second lead bonded to the second electrode, and a third lead bonded to the third electrode, the first, second and third leads extending away from the device in the same direction thereby enabling the device to be mounted to and connected to a printed circuit board.

17. The electrical overcurrent sensing device of claim 6 further comprising a first lead bonded to the first electrode, and a second lead bonded to the second electrode, the first and second leads preformed to extend over outer ends of the device in a uniform direction, whereby the device may be mounted to and connected to a printed circuit board, and further comprising a bonding medium for connecting the third electrode to the printed circuit board.

18. The electrical overcurrent sensing device of claim 14 wherein the bridging portion is symmetrical about a longitudinal axis of symmetry extending along the top major surface of the device, and firther comprising a second control electrode of metal foil formed as part of, and substantially coplanar with, the metal foil conductor and separated from the control electrode by a metal removal process during a manufacturing step, and a second electrical connector comprising at least one via for connecting the third electrode to the second control electrode.

19. A generally rectangular electrical overcurrent sensing device comprising:
   a planar sheet of material which exhibits a positive temperature coefficient of resistance (PTC) and which comprises an organic polymer having a particulate conductive filler dispersed therewithin, the planar sheet having a first major surface and having an opposite second major surface;
   a first conductive layer comprising a patterned metal foil thermally bonded and electrically connected to the first major surface, the patterned metal foil defining a current conductor including a first terminal electrode region at one end of the sheet, a second terminal electrode region at a second end of the sheet, and a current-concentrating region between the first and second terminal electrode regions;
   the current-concentrating region having a transverse cross-sectional area lying within a range of 0.1 to 0.8 times a transverse cross-sectional area of each of the first and second terminal electrode regions and being symmetrical about a longitudinal axis of symmetry between the first and second terminal electrode regions of the first major surface; and, a second conductive layer of metal foil electrically connected to the opposite second major surface so that an overcurrent condition flowing through the current conductor causes localized heating of the current-concentrating region that is conducted directly to the planar sheet of material to cause a secondary current flow from the current conductor through the sheet to the second conductive layer of metal foil to be reduced in accordance with said PTC so as to provide a control signal of said overcurrent condition, the patterned metal foil defining the current conductor also defining a third electrode and a fourth electrode adjacently spaced away from said current-concentrating region and further comprising at least a first via interconnecting the second conductive layer through the sheet to the third electrode, and at least a second via interconnecting the second conductive layer through the sheet to the fourth electrode.

* * * * *